US009378365B2

(12) United States Patent
Martini

(10) Patent No.: US 9,378,365 B2
(45) Date of Patent: *Jun. 28, 2016

(54) RECORDING ACTIVITY-TRIGGERED COMPUTER VIDEO OUTPUT

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,548

(22) Filed: Mar. 16, 2015

(65) Prior Publication Data

US 2015/0261953 A1 Sep. 17, 2015

Related U.S. Application Data

(63) Continuation of application No. 13/957,329, filed on Aug. 1, 2013, now Pat. No. 8,984,585, which is a continuation of application No. 13/447,150, filed on Apr. 13, 2012, now abandoned, which is a continuation-in-part of application No. 12/481,331, filed on Jun. 9, 2009, now Pat. No. 8,837,902.

(51) Int. Cl.
| | | |
|---|---|---|
| *G06F 21/55* | (2013.01) | |
| *H04L 29/08* | (2006.01) | |
| *H04N 9/79* | (2006.01) | |
| *H04L 29/06* | (2006.01) | |

(52) U.S. Cl.
CPC .......... *G06F 21/552* (2013.01); *H04L 63/1408* (2013.01); *H04L 67/22* (2013.01); *H04N 9/79* (2013.01); *G06F 2221/034* (2013.01)

(58) Field of Classification Search
CPC .. G06F 21/552; G06F 2221/034; H04L 67/22
See application file for complete search history.

(56) References Cited

U.S. PATENT DOCUMENTS

| | | | |
|---|---|---|---|
| 6,907,533 B2 | 6/2005 | Sorkin et al. | |
| 7,502,797 B2 | 3/2009 | Schran et al. | |
| 7,996,374 B1 | 8/2011 | Jones et al. | |
| 8,926,335 B2 * | 1/2015 | Kumar | G09B 7/00 434/322 |
| 2001/0039579 A1 | 11/2001 | Treka et al. | |
| 2002/0095601 A1 | 7/2002 | Hind et al. | |
| 2004/0010720 A1 | 1/2004 | Singh et al. | |
| 2006/0059557 A1 | 3/2006 | Markham et al. | |
| 2007/0180101 A1 | 8/2007 | Chen et al. | |
| 2007/0240214 A1 | 10/2007 | Berry | |

(Continued)

*Primary Examiner* — Joseph P Hirl
*Assistant Examiner* — Thomas Gyorfi
(74) *Attorney, Agent, or Firm* — Fish & Richardson P.C.

(57) ABSTRACT

An application that is capable of monitoring Internet or network traffic and performing recordings of computer video output based on one or more violations of network activity policies. The recording application can be installed on the computer to be recorded or another computer or server that is connected through the network to the computer to be recorded. The monitoring application contains a configuration interface that allows a user to set thresholds for certain types of network policy violations. When the one or more violations are detected, the recording application will begin recording video of the computer's video activity. The application can be configured to include settings such as the length of the recording. In a typical environment, the application is a hardware appliance that is capable of monitoring web activity and network traffic and can connect to the computer over the network in order to perform the recording.

22 Claims, 9 Drawing Sheets

(56) References Cited

U.S. PATENT DOCUMENTS

| | | |
|---|---|---|
| 2008/0199155 A1 | 8/2008 | Hagens et al. |
| 2008/0301794 A1 | 12/2008 | Lee |
| 2009/0064248 A1 | 3/2009 | Kwan et al. |
| 2009/0187968 A1 | 7/2009 | Roese et al. |
| 2010/0036945 A1 | 2/2010 | Allibhoy et al. |
| 2010/0191575 A1 | 7/2010 | Raleigh |
| 2010/0313229 A1 | 12/2010 | Martini |

* cited by examiner

600

| Default | OverrideU | Managers | Employees | Override |

REAL-TIME USER ACTIVITY MONITORING [?]

○ Disabled
● Enabled         14

TRIGGER LEVEL AND INTERVAL [?]

Trigger when [2] events occur within [2 minutes ▼]    10

VIDEO DESKTOP RECORDING [?]

○ Disabled
● Enabled
Record video for [1 minute ▼]    56

INCLUDE THE FOLLOWING CATEGORIES [?]

☐ Ads               ☐ Entertainment       ☐ Mobile Phones      ☑ Shopping
☐ Adult Content     ☐ File Sharing        ☐ News               ☐ Sports
☐ Alcohol/Tobacco   ☐ Finance &           ☐ Organizations      ☐ Streaming Radio/TV
☐ Art                 Investment          ☑ Porn/Nudity        ☐ Technology
☐ Auctions          ☐ Forums              ☐ Porn-Child         ☐ Toolbars
☐ Audio & Video     ☐ Friendship          ☐ Political          ☐ Transportation
☐ Bikini/Swimsuit   ☐ Gambling            ☐ Private Websites   ☐ Travel        12
☐ Business          ☐ Games               ☐ Real Estate        ☐ Violence & Hate
☐ Dating & Personals ☐ Government         ☐ Religion           ☐ Virus & Malware
☐ Dictionary        ☐ Guns & Weapons      ☐ Restaurants/Food   ☐ Web-based E-mail
☐ Drugs             ☐ Health              ☐ Search Engines     ☐ Web Hosting
☐ Education         ☐ Image Search        ☐ Services           ☑ Web Proxies
                    ☐ Jobs                ☐ Sex Ed

REAL-TIME EMAIL ALERTS [?]

○ Disabled
● Enabled

GROUP EMAIL CONTACT [?]

GLOBAL GROUP VNC PASSWORD [?]

○ Disabled
● Enabled
VNC Password:  [*******]
VNC Port:      [5900]

FIG. 6

RECORDING ACTIVITY-TRIGGERED COMPUTER VIDEO OUTPUT

CROSS-REFERENCE TO RELATED APPLICATIONS

This application is a continuation application of and claims priority to U.S. application Ser. No. 13/957,329, filed on Aug. 1, 2013, which is a continuation application of and claims priority to U.S. application Ser. No. 13/447,150, filed on Apr. 13, 2012, which is a continuation-in-part application of and claims priority to U.S. application Ser. No. 12/481,331, filed on Jun. 9, 2009.

FIELD

The present disclosure relates to computers and, more particularly, to computers attached to a network capable of having their video output recorded.

BACKGROUND

Internet use has continued to grow at a rapid pace. With this growth, the use of the web has expanded to much more than just web browsing and has allowed many applications to utilize the Internet as well. Unfortunately, the massive expansion of the web has negative consequences as well. There are situations where content on the Internet is inappropriate. Situations where content on the Internet is inappropriate may include "adult oriented" material being exposed to children, or use of the Internet against a company's Internet use policy for non-work related activities. Furthermore, there are many situations where computers make automated requests, such as for advertisements, which are not performed by the user but instead are triggered automatically by applications on the computer. Due to the need to block or filter out inappropriate content, web filters have been developed that can be configured to block or monitor inappropriate content based on the environment.

Hardware based web filters are appliances that can be installed on a network inside a firewall to provide web filtering in a centralized place. The appliances also do not require the use of software to be installed on computers on the network making the appliances easier to configure and manage, especially in large environments.

Web filters not only block certain content from reaching a computer on the network, but the Web filters also log and generate reports based on the activity on the network. The activity report typically contains the computer or user activity including violations to the filtering policy. Web filtering reports for policy violations show web site activity as well as violating activity.

SUMMARY

In one aspect, a method of recording a network access policy violation includes detecting the network access policy violation by a first computer on a network and in response to the detecting, capturing a video output of the first computer.

In another aspect, a computer-accessible medium includes a detector of a network access policy violation by a first computer on a network and a capturer of video output of the first computer, in which the capturer is operably coupled to the detector.

In yet another aspect, a hardware-based web filter appliance includes a detector of a network access policy violation, the network access policy violation being associated with the IP address of a monitored computer, a capturer of video output of the monitored computer, operably coupled to the detector and a storer of the video output, the storer being operably coupled to the capturer, wherein the video output of the monitored computer further comprises mouse movement of the monitored computer.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 6 shows an example of the types of settings that can used to configure the trigger settings, in accordance with an implementation;

For purposes of clarity and brevity, like elements and components will bear the same designations and numbering throughout the Figures.

DETAILED DESCRIPTION

Figure 1:
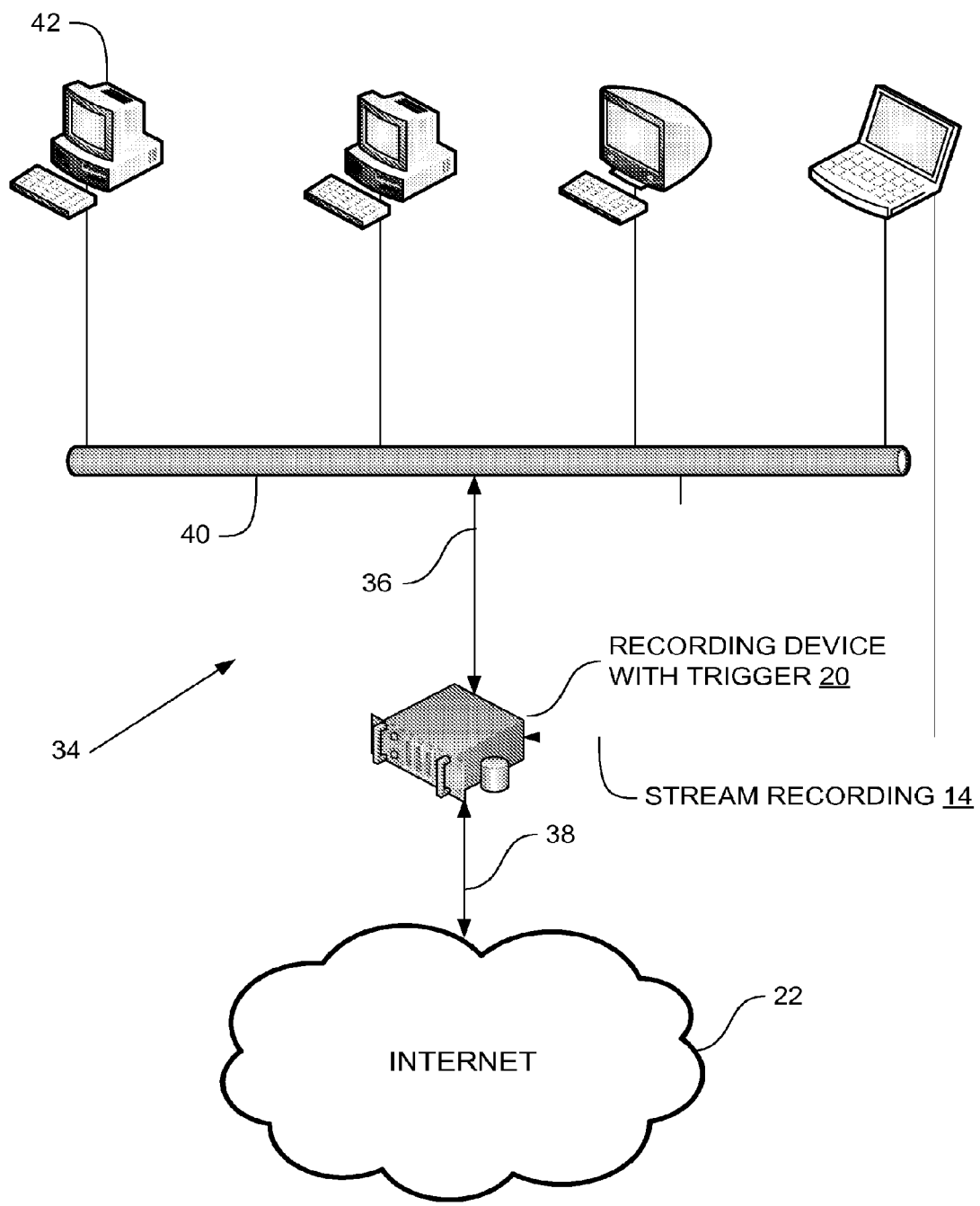
FIG. 1 is a perspective view of a threshold based video desktop recording system and interaction of components of the system, in accordance with an implementation.

In the following detailed description, reference is made to the accompanying drawings that form a part hereof, and in which is shown by way of illustration specific implementations which can be practiced. The implementations are described in sufficient detail to enable those skilled in the art to practice the implementations, and it is to be understood that other implementations can be utilized and that logical, mechanical, electrical and other changes can be made without departing from the scope of the implementations. The following detailed description is, therefore, not to be taken in a limiting sense.

It will be appreciated that for simplicity and clarity of illustration, where considered appropriate, reference numerals can be repeated among the figures to indicate corresponding or analogous elements. In addition, numerous specific details are set forth in order to provide a thorough understanding of the implementations described herein. However, it will be understood by those of ordinary skill in the art that the implementations described herein can be practiced without the specific details. In other instances, well-known methods, procedures and components have not been described in detail so as not to obscure the implementations described herein. Also, the description is not to be considered as limiting the scope of the implementations described herein.

Referring to FIG. 1 an automatic threshold based video desktop recording system includes an entire system 34 located on a computer network. The entire system 34 includes monitored computers 42 connected to a network connection 40. The monitored computers 42 can include personal computers or workstations, but the monitored computers 42 can be any other terminal that is capable of generating network traffic and can be attached to a network connection 40 or a device capable of having a video output of the device recorded. The network connection 40 can be an Ethernet network, but can also be any other type of network capable of carrying network traffic such as Fiber Channel, ATM, ITU-T, and G.hn. The monitored computers 42 can be connected to a local area network, but can also be part of any type of network configuration including a personal area network, campus area network, metropolitan area network, wide area network, global area network, virtual private network, internetwork, intranet, extranet or the Internet 22. In FIG. 1, the monitored computers are connected to a local area network. The network connection 40 is connected to a recording application 20 capable of monitoring traffic between the Internet 22 and the monitored computers 42. The recording application 20 in the diagram is a hardware appliance, but can include a software system which is installed on another network appliance such as a router or a switch 52. The recording apparatus is capable of containing activity thresholds that the recording apparatus can use to determine when to start an automatic recording.

Within the entire system 34, the major data interactions are:

36: Transmission of local monitored data 36 to and from the monitored computers 42 through the monitoring and recording application 20. The local monitored data 36 data is monitored by the recording application 20 and compared against activity thresholds. The activity thresholds are preconfigured by a network administrator, but can be self adjusting and dynamically adjusted by the monitor based on network activity.

20: The recording application 20 monitors incoming and outgoing data from the monitored computers 42 and begins a recording if the type of network activity matches the configured criteria and threshold level. If a threshold is reached, the recording application 20 opens a video recording stream 44 with the computer from a monitored computer 42 that reached an activity threshold of the monitored computer.

38: Internet monitored data 38 enters the recording application 20 from the Internet 22 and can also be compared against activity thresholds and contribute toward the activity threshold being reached. The data entering from the Internet 22 is associated with one of the monitored computers 42 by associating network attributes such as source and destination IP address of the data. The data entering from the Internet 22 data can also contribute to the overall activity trigger threshold 10 and can trigger a recording to begin between the recording application 20 and the computer from the group of monitored computers 42.

The ability to obtain and store video recordings of a desktop video computer based on the computer user's activity on the Internet is a great tool for auditing and tracking actual computer use. Enforcement of web access policy or in generating an audit trail is helped by obtaining a recording of the video output of the computer (including mouse movements displayed in the video output) at specific times, especially when policy violations are occurring. The video recording provides a visual view of what the user of the computer was doing while the violations occurred. The video recording reduces ambiguity in the source of the culpability for the violation because there are many situations where computers make automated requests, such as for advertisements, which are not performed by the user but instead are triggered automatically by applications on the computer, which can be more easily determined through the video recording of the output of the computer.

Software components capable of recording a computer's video desktop include Virtual Network Computing (VNC), which can record a desktop over a network connection. VNC is a software tool used to capture video data 38 from a computer and trace video over a network to a remote system. VNC was originally developed at the Olivetti Research Laboratory in Cambridge, United Kingdom. The original VNC source code and many modern derivatives are open source under the GNU General Public License.

The systems, method and apparatus described herein do not include manually clicking on "start" and "stop" buttons to control recordation of a computer's video desktop. The manual clicking of "start" and "stop" buttons to control recordation of a computer's video desktop requires manual user intervention and makes capturing the relevant video of computer usage very difficult because the person triggering the recording must know when to start and stop the recording. Monitoring of a computer's video desktop is also very time consuming and not practical in many situations especially for the purpose of web content filtering as the person capturing the video would need to know when to start the recording based on the monitored user's computer or Internet usage. In cases where an administrator would like to record a desktop based on certain actions occurring on a computer, such as opening a program, the manual clicking of the "start" and "stop" buttons to control the recordation is very unpractical as the administrator would need viewing distance of the computer and observe all actions in order to determine a video recording is necessary. The computer to be recorded can have specific software that is capable of capturing the video or can use industry standard video capturing software such as VNC. VNC can be used to view and control computers as well as send video images of the computer and the application can utilize an existing application such as VNC to perform the recording over the network. The recording application can integrate with software tools such as VNC and does not require specifically developed proprietary software to be installed on the monitored computer in order to perform a recording of the video output of the computer.

Referring to FIG. 1 in more detail, the recording-source-computer 46 is indicated to start the recording by recording-storage-computer 50. The recording-source-computer 46 must be capable of capturing video output of the recording-source-computer 46. Typically the video output of the recording-source-computer 46 is the video seen on the monitor directly attached to the computer being recorded. Capturing video output of the recording-source-computer 46 can be accomplished by a variety of techniques. The operating system running on the recording-source-computer 46 can have the feature of capturing video output of the recording-source-computer 46 built in. Another technique would involve providing proprietary software to be installed on computer performing recording so that the software can perform the recording process and transfer the video data 48 to the recording-storage-computer 50. However, a very good way of generating the recording is to use software tools that are capable of performing desktop video capture and are commonly in use in the field. In some implementations, the recording-storage-computer 50 is capable of interacting with existing software systems, such as VNC, so that current network infrastructure can be utilized. Using VNC also reduces the overhead of configuring the system as VNC may already be installed on the monitored computers 42. When VNC is previously installed on the computer, the recording-storage-computer 50 will interact with the VNC software that is installed on the recording-source-computer 46. The recording-storage-computer 50 will indicate to the installed VNC software on the recording-source-computer 46 the start of recording 30 and transfer video data 48 to the recording-storage-computer 50.

Figure 2:
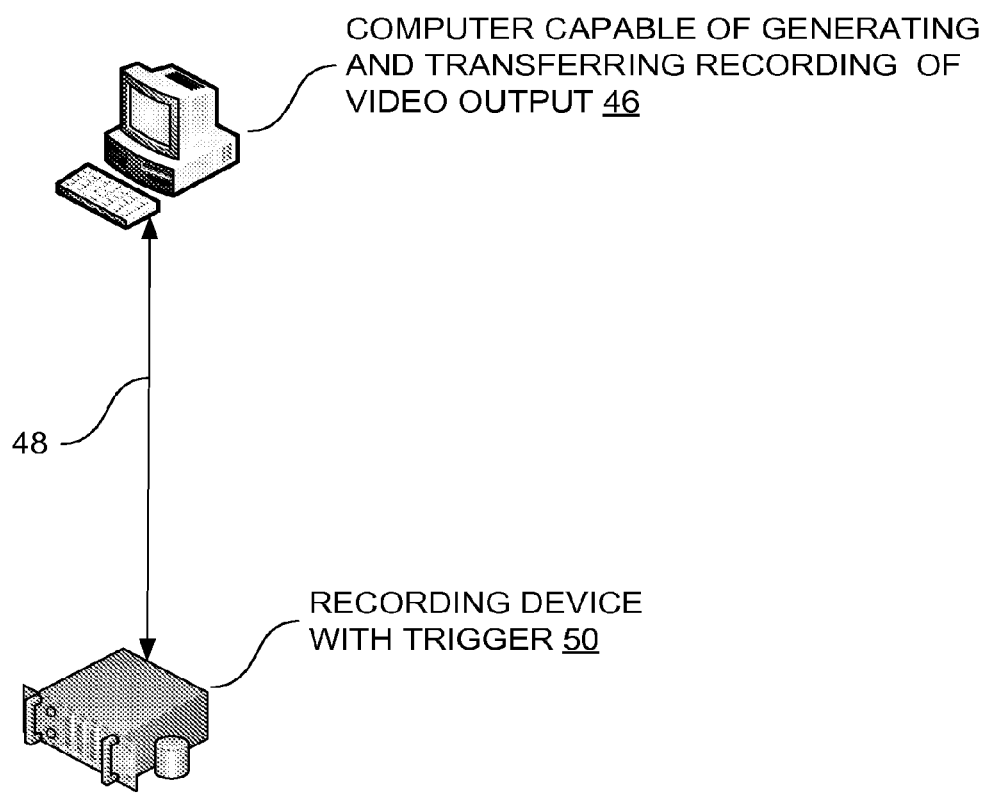
FIG. 2 is a perspective view of an illustration of interaction between recording application and computer whose video monitor output is being recorded, in accordance with an implementation.

Referring to the recording-storage-computer 50 in FIG. 2 in more detail, the recording-storage-computer 50 is capable of communicating over a network via the protocol offered on the recording-source-computer 46. The recording-storage-computer 50 can be a dedicated hardware appliance for communicating over a network via the protocol offered on the recording-source-computer 46 and can be integrated within a hardware appliance with other primary purposes such as an Internet 22 Web Filter, a switch 52, a gateway, or a router. An important aspect of the recording-storage-computer 50 is the ability able to monitor the network data in order to determine if activity warrants a recording between the apparatus performing recording and the recording-source-computer 46 is necessary.

The recording application 20 does not need to be inline with the data path. The recording application 20 can be attached to a network via a Tap, which mirrors data running through another device, such as a switch 52, to another port for the purpose of monitoring. Network taps are a common way of monitoring traffic on a network without having to place a hardware appliance inline of the data path. Monitoring traffic on a network without having to place a hardware appliance inline of the data path allows the recording application 20 to monitor the traffic and determine when a recording is necessary. Determining when a recording is necessary eliminates the recording application 20 from being a point of failure on a network but can still monitor network activity to determine if a computer desktop recording is necessary and perform the recording.

Figure 3:
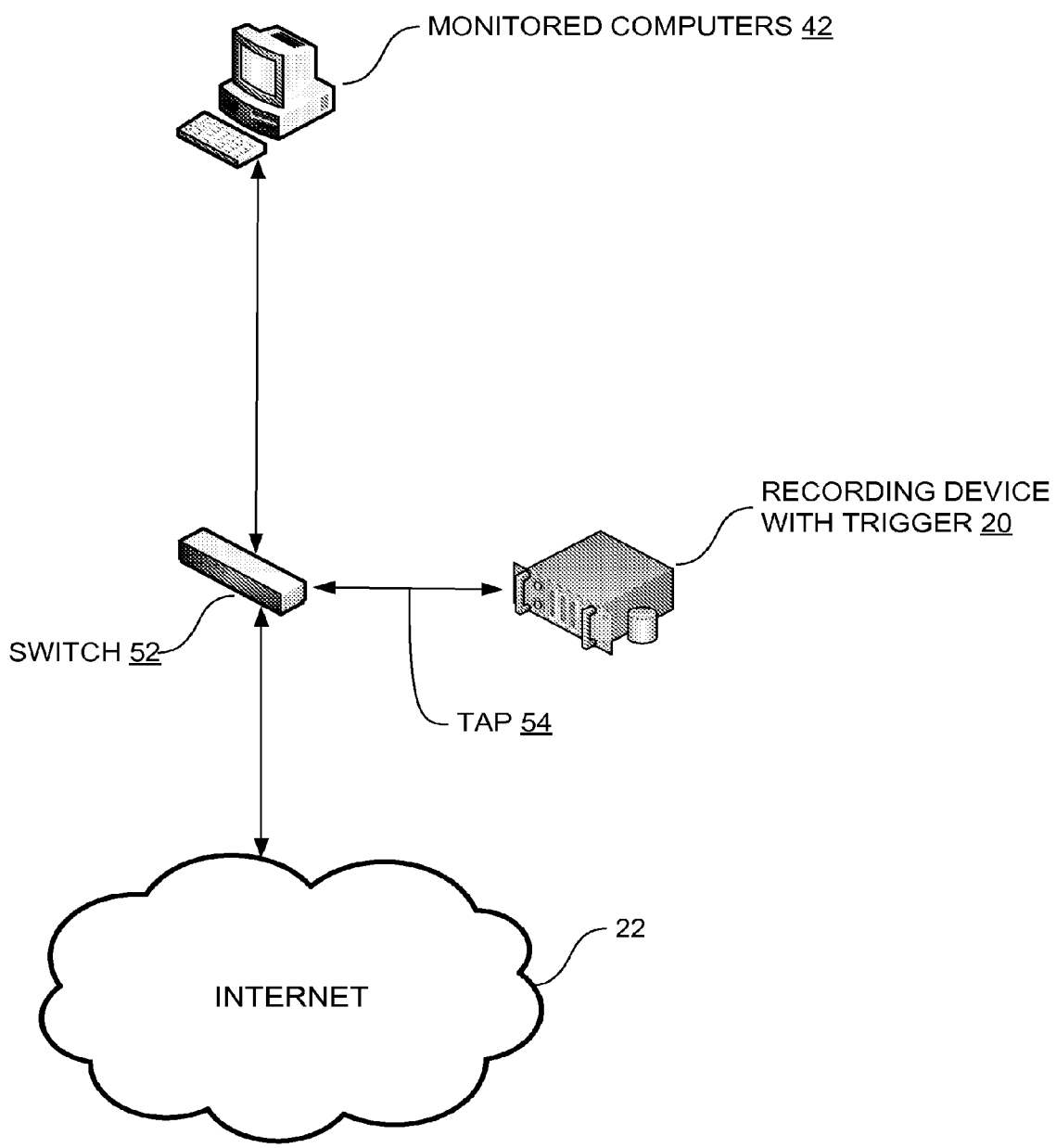
FIG. 3 is a perspective view of an illustration of recording application configured to use a network tap instead of being placed inline with the data path, in accordance with an implementation.

Referring to FIG. 3 in more detail which illustrates the recording application 20 in network tap 54 configuration, the monitored computers 42 run data to and from the Internet 22 through the switch 52. The switch 52 mirrors data travelling between the monitored computers 42 and Internet 22 onto the network tap 54 which is delivered to the recording application 20. The recording application 20 evaluates the data based on network use activity and thresholds of the recording application 20 and performs a recording to one of the monitored computers 42 if necessary.

Particular methods of implementation are described by reference to a series of flowcharts in FIGS. 4 and 5. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions.

Figure 4:
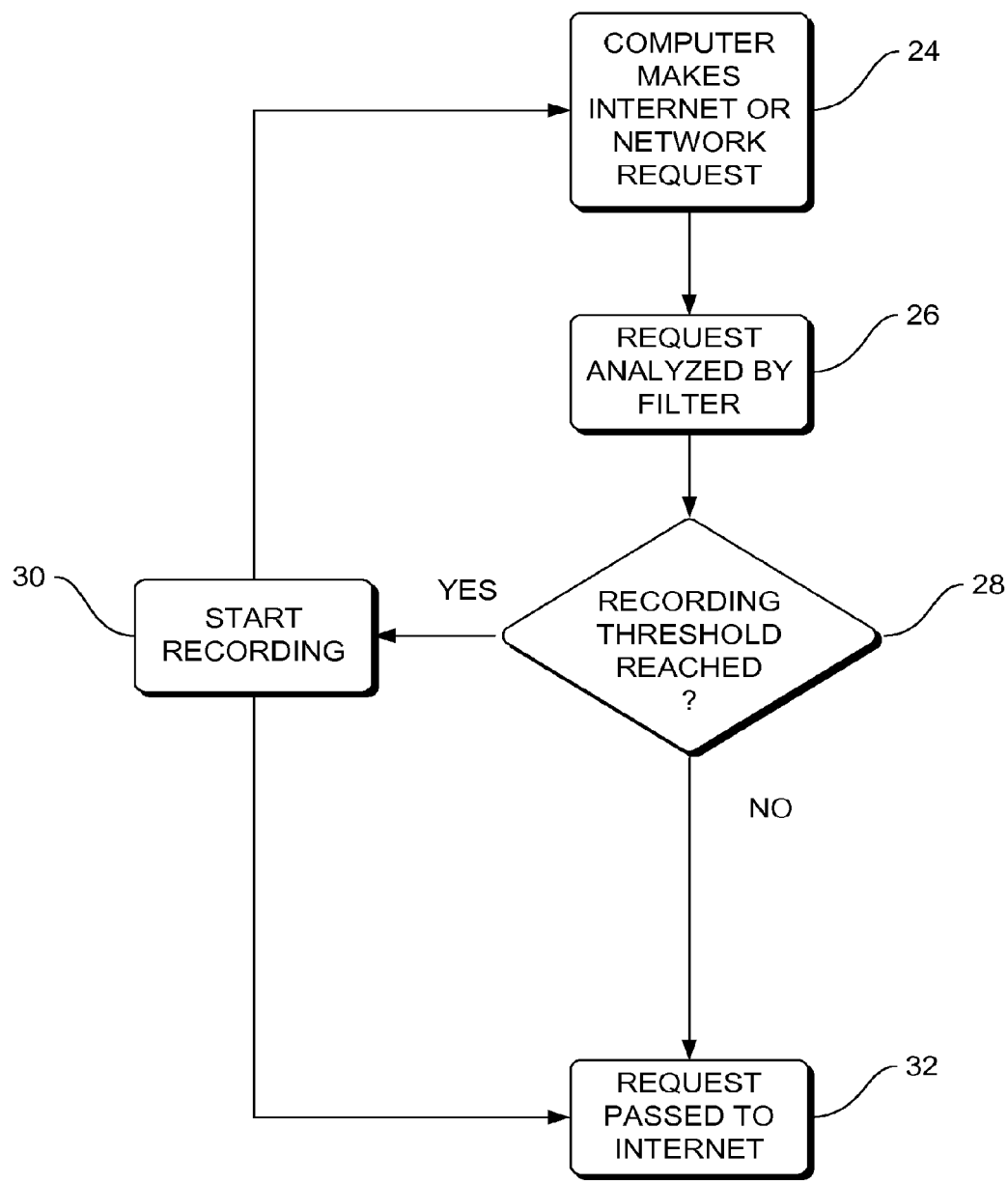
FIG. 4 is a perspective view of a diagram illustrating a method of a threshold based video desktop recording system in more detail, in accordance with an implementation.
Figure 5:
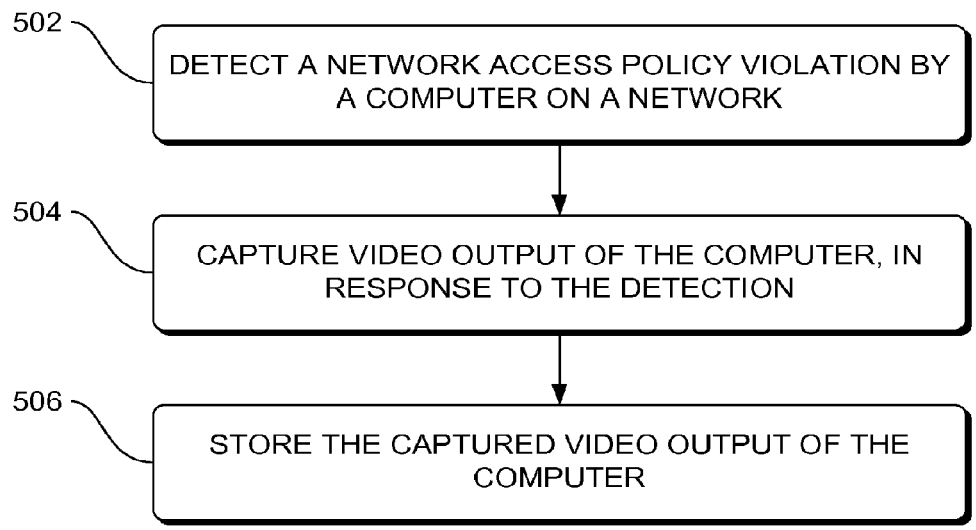
FIG. 5 is a perspective view of a diagram illustrating a method of the policy-violation based video desktop recording system in more detail, in accordance with an implementation.
Figure 8:
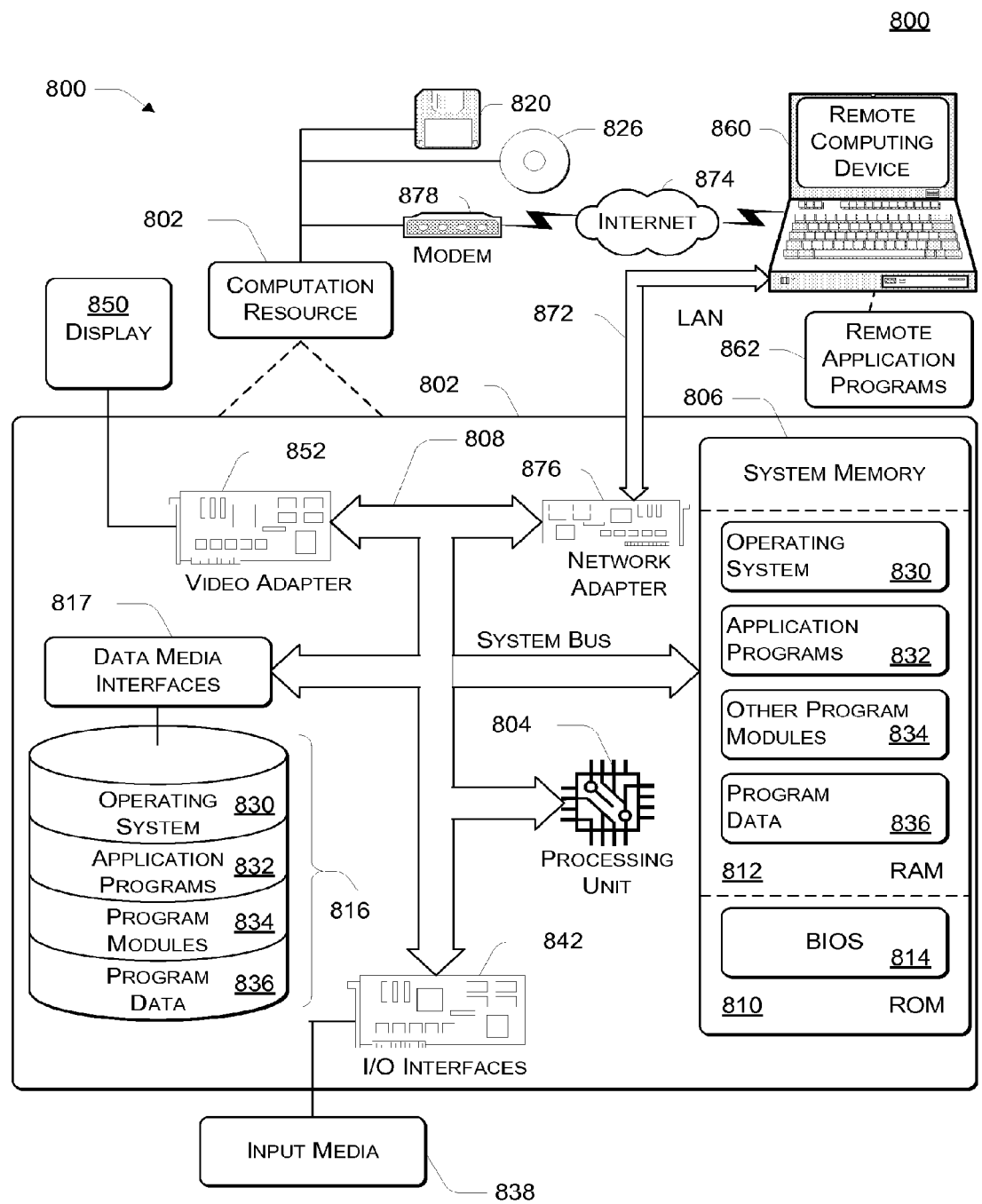
FIG. 8 illustrates an example of a general computer environment 800, according to an implementation.

In some implementations, methods in FIGS. 4 and 5 are implemented as a sequence of instructions which, when executed by a processor, such as processing units 804 in FIG. 8, cause the processor to perform the respective method. In other implementations, the methods in FIGS. 4 and 5 are implemented as a computer-accessible medium having executable instructions capable of directing a processor, such as processing units 804 in FIG. 8, to perform the respective method. In varying implementations, the medium is a magnetic medium, an electronic medium, or an optical medium.

FIG. 4 shows a flow diagram describing the threshold based video recording process. The flow diagram shows an example of one of the monitored computers 42 making a network request 24 that will trigger a video desktop recording to occur. The computer makes a network request 24 which begins the process. The request is typically sent to the Internet 22 by the computer. The recording application 20 begins an analysis of request against threshold activity 26 to determine if a recording should be started. The threshold settings can include different types of activity including visiting particular websites, visiting website categories, or accessing a network enabled program. There are many other network activity types that can trigger a video recording. If the recording threshold is reached 28, the recording application 20 will indicate the start of recording 30 by initiating the application on the monitored computer capable of video recording to begin sending the computer's video stream over the network to the recording application 20. If the recording threshold has not been reached but contains activity that will contribute toward reaching the threshold, a counter is incremented which contributes toward the recording threshold. The request continues through the network 32 regardless of whether a recording was started or not. Whether or not the request continues through the network can be configurable, however and the request may be dropped depending on configuration. Also note that activity can be monitored entering from the Internet 22 to the monitored computers 42.

It is noted that the activity that contributes toward the threshold to start a recording is not limited to network activity. Activity contributing to the recording threshold can result from non-network activities performed locally on a computer. For example, non-network activities such as opening particular programs that are stored locally on the computer or performing certain actions on the computer can be included toward the recording threshold that trigger the recording.

The recording threshold is configured by selecting certain types of network activity which will count toward a threshold match. Typically, different types of activity are used to describe activities that match a threshold. For example, an activity match can be the act of visiting a shopping related website. Whenever a computer that is being monitored accesses a shopping related website on the Internet 22, the accesses to a shopping related website on the Internet 22 will contribute toward a threshold match. Thresholds are configured by setting the number of matches that must occur within a certain period of time before a recording is performed. There can be other criteria that can be added that can occur within a particular time interval to trigger a desktop recording. In addition, thresholds do not need to be time or interval based. A threshold can be configured that indicates a total number of matches to the selected criteria.

FIG. 5 shows a flow diagram of a policy-violation based video recording process 500. The policy-violation based video recording process 500 includes detecting the network access policy violation 502 by a first computer, such as monitored computer 42 or 46, on a network, such as 40. In response to the detecting 502, video output of the first computer is captured 504. In some implementations, the video output of the first computer is captured by a second computer that is operably coupled to the first computer through the network. In some implementations, the video output of the first computer is captured by the first computer.

Thereafter, the captured video output of the first computer is stored 506. In some implementations, the captured video output of the first computer is stored on a second computer.

The second computer is operably coupled to the first computer through the network. In implementations, the video output is a stream. In other implementations, the video output is a series of snapshot images.

FIG. 6 shows an example of the types of settings that can used to configure the trigger settings of violations of network activity policies. A trigger threshold 10 for the start of recording 30 is configured by specifying the number of violations of network activity policies that must occur within a configurable amount of time before a recording is started. As shown in FIG. 6, the user has configured that a total of 2 violations of network activity policies must occur within a 2 minute time period before a recording is triggered to occur. The user can also configure settings such as the recording length 56 so that the recording application 20 can perform recordings for a particular amount of time once the threshold has been reached. The user can also configure what types of activity contribute toward the trigger threshold 10 by selecting the types of activities, such as the trigger activity settings 12 shown. In selecting the types of activities, the user selects categories of web browsing activity that contribute toward the recording threshold. For example, web browsing requests can be categorized into specific categories depending on the type of content on the website. Whenever the recording apparatus detects a request for a website within the selected category, the recording apparatus increments the number of violations of network activity policies that have occurred within the threshold interval. If the number of violations of network activity policies that have occurred exceed the amount set in the threshold settings, a recording begins. Threshold settings can also be categorized into groups. The group settings 14 found toward the top of the illustration allow different settings to be applied to different computer groupings. Monitored computers 42 can be associated with the groups so that different thresholds can apply to different computers. Assigning monitored computers 42 to groups can be performed by many methods such as by using the computer's IP Address, using the computer's MAC address, or based on the currently logged in user of the computer.

In addition, there are many cases where a network administrator would like to perform a recording of a computer's desktop while certain types of violations of network activity policies are occurring. For example, recording of the computer's desktop while certain types of violations of network activity policies is occurring is very desirable in the case of Internet 22 web filtering where filters are used to block users from accessing particular content on the Internet 22. In certain cases, an administrator would prefer the recording to occur while the user is attempting to access Internet 22 resources that have been restricted or are of interest to the administrator. Programs such as VNC allow users to manually start recordings. However, manually starting recordings is very tedious. Having to perform a manual recording while the user is attempting to access Internet 22 resources that have been restricted or are of interest to the administrator is nearly impossible as the administrator would have to physically and manually monitor the activity on the computer's monitor and select the record button when the activity in question is being performed. Having to physically or manually monitor the computer's video desktop is not only inefficient but can cause a problem as the activity on the computer is not likely to occur if the user of the computer notices that the computer is being monitored by the administrator. In comparison, triggering recordings based on violations of network activity policies allows the starting of recording to be automated free of user intervention. Having automatic thresholds ensures transparent and seamless monitoring and recording without any user intervention.

The video recordings are stored on the recording apparatus for later viewing. The format for the stored recordings can vary in format. Portable formats can be conveniently viewed via a browser interface. For example, an administrator can later log into the recording application 20 through a web browser interface and click on the recorded video desktops to view the recorded video desktops. Alternatively, the recordings can be viewed in other applications and can be presented by the recording application 20 for download so that the recordings can be stored locally on the user computer.

Figure 7:
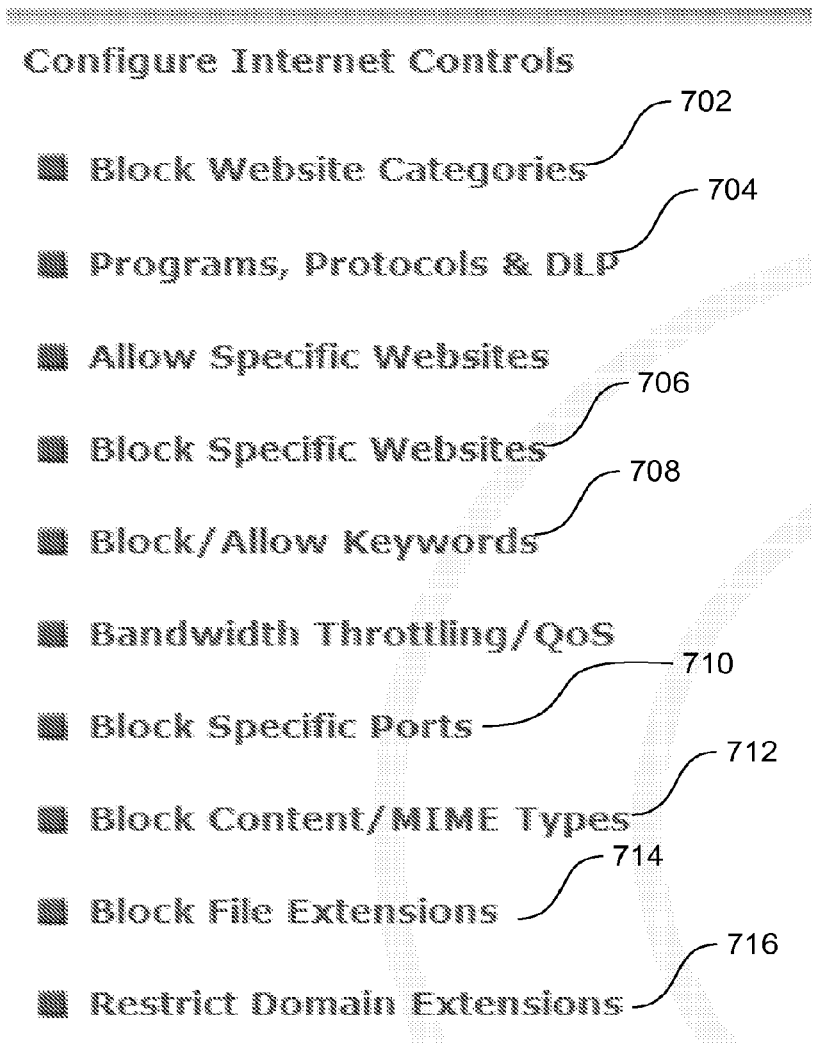
FIG. 7 shows settings that can used to configure the trigger settings, in accordance with an implementation.

FIG. 7 shows settings 700 to configure the trigger settings of violations of network activity policies, in accordance with an implementation;

Internet controls 700 can be set to block website categories 702, block programs, protocols and data loss prevention 704, block specific websites 706, block specific keywords 708, block access to specific ports 710, block specific content or MIME types 712, block specific file extensions 714 and or block specific domain extensions 716. Accessing any one of the blocked Internet controls 700 can be a network access activity that triggers video recording, such as in action 28 in FIG. 4 or action 502 in FIG. 5.

In the specification of website categories 702 to be blocked, any one of a number of different categories can be specified as being blocked such as advertisements, adult content, alcohol/tobacco, art, auctions, audio and video, bikinis/swimsuit, business, dating and personals, dictionary, drugs, education, entertainment, file sharing, finance and investment, forums, friendship, gambling, games, government, guns and weapons, health, images/video search, jobs, mobile phones, news, organizations, political, porn/nudity, porn/child, private websites, real estate, religion, or restaurants/food, search engines, services, sex education, shopping, sports, streaming radio/TV, technology, toolbars, transportation, travel, violence and hate, virus and malware, web-based e-mail, web hosting and/or web proxies. In the specification of programs, protocols to be blocked and data loss prevention 704, programs relating to chat, such as AOL Instant Messenger, Yahoo messenger, ICQ, MSN messenger, IRC, Jabber or Yahoo file transfer can be blocked. Programs relating to online gaming such as World of Warcraft, station.Sony.com, Microsoft Xbox and/or Battle.net can be blocked. Filesharing programs such as LimeWire, bearshare, Xolox, Acquisition, ZP2P, BitTorrent, Edonkey, Manolito and/or Ares can be blocked. Protocols relating to Facebook posting, Google translation filtering, clean YouTube or encrypted YouTube, SSH/secure Shell, RDP/remote desktop access, FTP file transfer protocol, Google encrypted search in Google encrypted access, ping ICMP, proxy blocking GLYPE, hotspot Shield, SSL on nonstandard ports, rogue encrypted connections, newsgroups and/or internal servers can be blocked. In the specification of specific websites to be blocked 706, specific URLs can be blocked such as Playboy.com, adults.com, guns.com, Facebook.com and/or bombs.com. In the specification of specific key words 708 to be blocked, keywords such as "guns" or "bomb" can be specified. In the specification of specific ports 710 to be blocked, a port such as port 1080 can be blocked. In the specification of file extensions 714 to be blocked, a file extensions such as PDF can be blocked. In the specification of domain extensions 716 to be blocked, a top-level domain (TLD) can be specified to be blocked.

FIG. 8 illustrates an example of a general computer environment 800 useful in the context of the environment of computer 42 or 46, in accordance with an implementation of the disclosed subject matter. The general computer environment 800 includes a computation resource 802 capable of implementing the processes described herein. It will be appreciated that other devices can alternatively used that include more components, or fewer components, than the components illustrated in FIG. 8.

The illustrated operating environment 800 is only one example of a suitable operating environment, and the example described with reference to FIG. 8 is not intended to suggest any limitation as to the scope of use or functionality of the implementations of this disclosure. Other well-known computing systems, environments, and/or configurations can be suitable for implementation and/or application of the subject matter disclosed herein.

The computation resource 802 includes one or more processors or processing units 804, a system memory 806, and a bus 808 that couples various system components including the system memory 806 to processor(s) 804 and other elements in the environment 800. The bus 808 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 806 includes nonvolatile read-only memory (ROM) 810 and random access memory (RAM) 812, which can or can not include volatile memory elements. A basic input/output system (BIOS) 814, containing the elementary routines that help to transfer information between elements within computation resource 802 and with external items, typically invoked into operating memory during start-up, is stored in ROM 810.

The computation resource 802 further can include a non-volatile read/write memory 816, represented in FIG. 8 as a hard disk drive, coupled to bus 808 via a data media interface 817 (e.g., a SCSI, ATA, or other type of interface); a magnetic disk drive (not shown) for reading from, and/or writing to, a removable magnetic disk 820 and an optical disk drive (not shown) for reading from, and/or writing to, a removable optical disk 826 such as a CD, DVD, or other optical media.

The non-volatile read/write memory 816 and associated computer-readable media provide nonvolatile storage of computer-readable instructions, data structures, program modules and other data for the computation resource 802. Although the exemplary environment 800 is described herein as employing a non-volatile read/write memory 816, a removable magnetic disk 820 and a removable optical disk 826, other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 816, magnetic disk 820, optical disk 826, ROM 810, or RAM 812, including an operating system 830, one or more application programs 832, other program modules 834 and program data 836. Examples of computer operating systems conventionally employed for some types of three-dimensional and/or two-dimensional medical image data include the NUCLEUS® operating system, the LINUX® operating system, and others, for example, providing capability for supporting application programs 832 using, for example, code modules written in the C++® computer programming language.

A user can enter commands and information into computation resource 802 through input devices such as input media 838 (e.g., keyboard/keypad, tactile input or pointing device, mouse, foot-operated switching apparatus, joystick, touch-screen or touchpad, microphone, antenna etc.). Such input devices 838 are coupled to the processing unit 804 through a conventional input/output interface 842 that is, in turn, coupled to the system bus. A monitor 850 or other type of display device is also coupled to the system bus 808 via an interface, such as a video adapter 852.

The computation resource 802 can include capability for operating in a networked environment (as illustrated in FIG. 1-3, for example) using logical connections to one or more remote computers, such as a remote computer 860. The remote computer 860 can be a personal computer, a server, a router, a network PC, a peer device or other common network node, and typically includes many or all of the elements described above relative to the computation resource 802. In a networked environment, program modules depicted relative to the computation resource 802, or portions thereof, can be stored in a remote memory storage device such as can be associated with the remote computer 860. By way of example, remote application programs 862 reside on a memory device of the remote computer 860. The logical connections represented in FIG. 8 can include interface capabilities, e.g., such as interface capabilities 1452 (FIG. 1-3) a storage area network (SAN, not illustrated in FIG. 8), local area network (LAN) 872 and/or a wide area network (WAN) 874, but can also include other networks.

Such networking environments are commonplace in modern computer systems, and in association with intranets and the Internet. In certain implementations, the computation resource 802 executes an Internet Web browser program (which can optionally be integrated into the operating system 830), such as the "Internet Explorer®" Web browser manufactured and distributed by the Microsoft Corporation of Redmond, Wash.

When used in a LAN-coupled environment, the computation resource 802 communicates with or through the local area network 872 via a network interface or adapter 876. When used in a WAN-coupled environment, the computation resource 802 typically includes interfaces, such as a modem 878, or other apparatus, for establishing communications with or through the WAN 874, such as the Internet. The modem 878, which can be internal or external, is coupled to the system bus 808 via a serial port interface.

In a networked environment, program modules depicted relative to the computation resource 802, or portions thereof, can be stored in remote memory apparatus. It will be appreciated that the network connections shown are exemplary, and other means of establishing a communications link between various computer systems and elements can be used.

A user of a computer can operate in a networked environment 1400 using logical connections to one or more remote computers, such as a remote computer 860, which can be a personal computer, a server, a router, a network PC, a peer device or other common network node. Typically, a remote computer 860 includes many or all of the elements described above relative to the computer 800 of FIG. 8.

The computation resource 802 typically includes at least some form of computer-readable media. Computer-readable media can be any available media that can be accessed by the computation resource 802. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 802.

Communication media typically embodies computer-readable instructions, data structures, program modules.

By way of example, and not limitation, communication media include wired media, such as wired network or direct-wired connections, and wireless media, such as acoustic, RF, infrared and other wireless media. The scope of the term computer-readable media includes combinations of any of the above.

Figure 9:
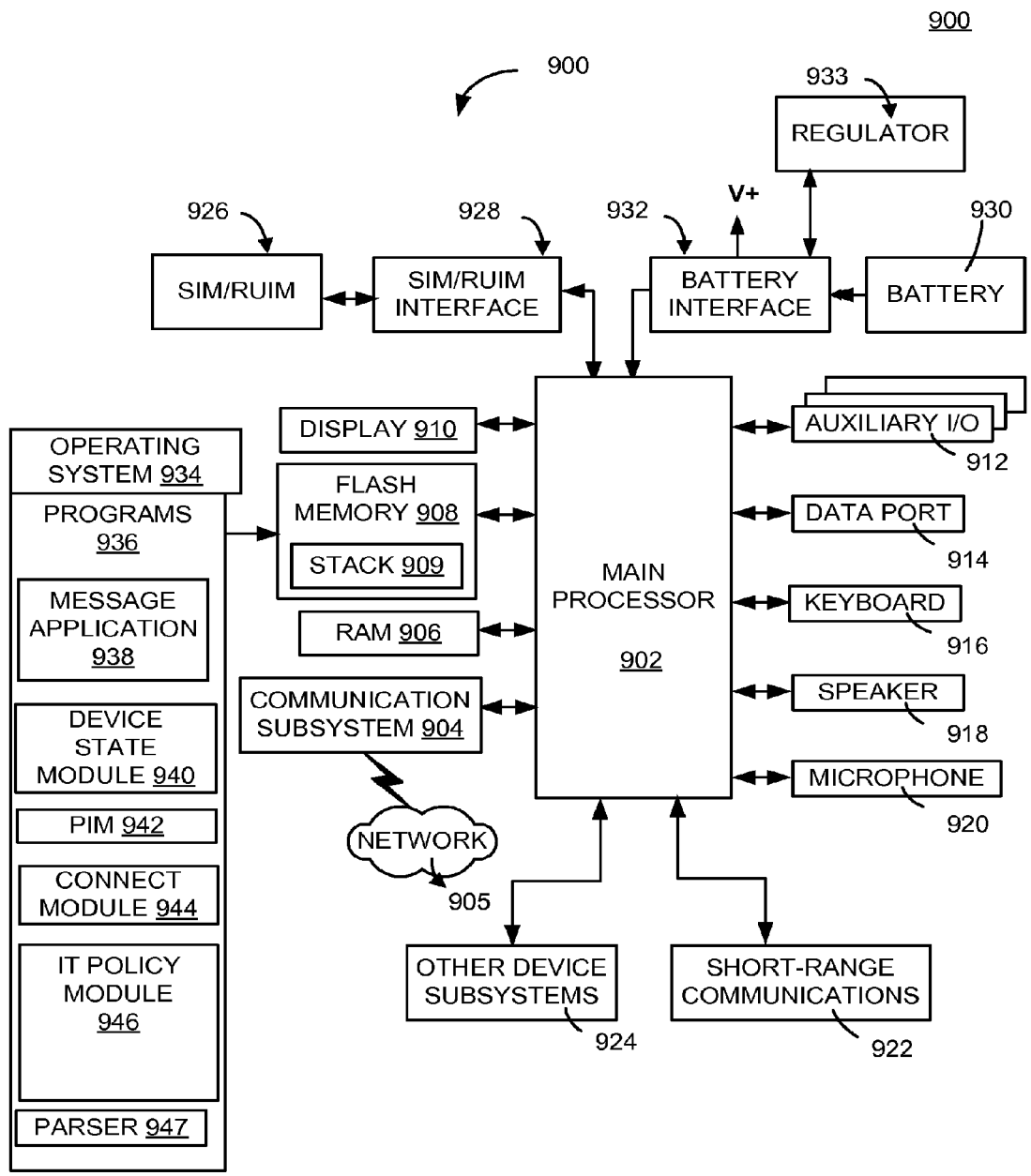
FIG. 9 is a block diagram of a mobile device, according to an implementation.

Referring to FIG. 9, shown therein is a block diagram of a mobile device 900, according to an implementation. The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Mobile device is one implementation of monitored computer 42 in FIG. 1 or 46 recording-source-computer 46 in FIG. 2. The mobile device 900 includes a number of components such as a main processor 902 that controls the overall operation of the mobile device 900. Communication functions, including data and voice communications, are performed through a communication subsystem 904. The communication subsystem 904 receives messages from and sends messages to wireless networks 905. The wireless networks 905 include the Wi-Fi access point 104 and the LTE network 112 in FIG. 1. In other implementations of the mobile device 900, the communication subsystem 904 can be configured in accordance with the Global System for Mobile Communication (GSM), General Packet Radio Services (GPRS), Enhanced Data GSM Environment (EDGE), Universal Mobile Telecommunications Service (UMTS), data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include Wi-Fi 802.11, Mobitex™ and DataTAC™ network communication systems. Examples of other voice-centric data networks include Personal Communication Systems (PCS) networks like GSM and Time Division Multiple Access (TDMA) systems.

The wireless link connecting the communication subsystem 904 with the wireless network 905 represents one or more different Radio Frequency (RF) channels. With newer network protocols, the RF channels are capable of supporting both circuit switched voice communications and packet switched data communications.

The main processor 902 also interacts with additional subsystems such as a Random Access Memory (RAM) 906, a flash memory 908, a display 910, an auxiliary input/output (I/O) subsystem 912, a data port 914, a keyboard 916, a speaker 918, a microphone 920, short-range communications 922 and other device subsystems 924. The flash memory 908 includes a stack 909.

Some of the subsystems of the mobile device 900 perform communication-related functions, whereas other subsystems may provide "resident" or on-device functions. By way of example, the display 910 and the keyboard 916 may be used for both communication-related functions, such as entering a text message for transmission over the wireless network 905, and device-resident functions such as a calculator or task list.

The mobile device 900 can send and receive communication signals over the wireless network 905 after required network registration or activation procedures have been completed. Network access is associated with a subscriber or user of the mobile device 900. To identify a subscriber, the mobile device 900 requires a SIM/RUIM card 926 (i.e. Subscriber Identity Module or a Removable User Identity Module) to be inserted into a SIM/RUIM interface 928 in order to communicate with a network. The SIM card or RUIM 926 is one type of a conventional "smart card" that can be used to identify a subscriber of the mobile device 900 and to personalize the mobile device 900, among other things. Without the SIM card 926, the mobile device 900 is not fully operational for communication with the wireless network 905. By inserting the SIM card/RUIM 926 into the SIM/RUIM interface 928, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 926 includes a processor and memory for storing information. Once the SIM card/RUIM 926 is inserted into the SIM/RUIM interface 928, it is coupled to the main processor 902. In order to identify the subscriber, the SIM card/RUIM 926 can include some user parameters such as an International Mobile Subscriber Identity (IMSI). An advantage of using the SIM card/RUIM 926 is that a subscriber is not necessarily bound by any single physical mobile device. The SIM card/RUIM 926 may store additional subscriber information for a mobile device as well, including datebook (or calendar) information and recent call information. Alternatively, user identification information can also be programmed into the flash memory 908.

The mobile device 900 is a battery-powered device and includes a battery interface 932 for receiving one or more rechargeable batteries 930. In one or more implementations, the battery 930 can be a smart battery with an embedded microprocessor. The battery interface 932 is coupled to a regulator 933, which assists the battery 930 in providing power V+ to the mobile device 900. Although current technology makes use of a battery, future technologies such as micro fuel cells may provide the power to the mobile device 900.

The mobile device 900 also includes an operating system 934 and software components 936 to 946 which are described in more detail below. The operating system 934 and the software components 936 to 946 that are executed by the main processor 902 are typically stored in a persistent store such as the flash memory 908, which may alternatively be a read-only memory (ROM) or similar storage element (not shown). Portions of the operating system 934 and the software components 936 to 946, such as specific device applications, or parts thereof, may be temporarily loaded into a volatile store such as the RAM 906. Other software components can also be included.

The subset of software applications 936 that control basic device operations, including data and voice communication applications, will normally be installed on the mobile device 900 during its manufacture. Other software applications include a message application 938 that can be any suitable software program that allows a user of the mobile device 900 to send and receive electronic messages. Various alternatives exist for the message application 938. Messages that have been sent or received by the user are typically stored in the flash memory 908 of the mobile device 900 or some other suitable storage element in the mobile device 900. In one or more implementations, some of the sent and received messages may be stored remotely from the device 900 such as in a data store of an associated host system with which the mobile device 900 communicates.

The software applications can further include a device state module 940, a Personal Information Manager (PIM) 942, and other suitable modules (not shown). The device state module 940 provides persistence, i.e. the device state module 940 ensures that important device data is stored in persistent memory, such as the flash memory 908, so that the data is not lost when the mobile device 900 is turned off or loses power.

The PIM 942 includes functionality for organizing and managing data items of interest to the user, such as, but not limited to, e-mail, contacts, calendar events, voice mails, appointments, and task items. A PIM application has the ability to send and receive data items via the wireless network 905. PIM data items may be seamlessly integrated, synchronized, and updated via the wireless network 905 with the mobile device subscriber's corresponding data items stored and/or associated with a host computer system. The PIM 942 can create a mirrored host computer on the mobile device 900 with respect to such items. The mirrored host computer on the mobile device 900 can be particularly helpful when the host computer system is the mobile device subscriber's office computer system.

The mobile device 900 also includes a connect module 944, and an IT policy module 946. The connect module 944 implements the communication protocols that are required for the mobile device 900 to communicate with the wireless infrastructure and any host system, such as an enterprise system, with which the mobile device 900 is authorized to interface. Examples of a wireless infrastructure and an enterprise system are given in FIGS. 22 and 23, which are described in more detail below.

The connect module 944 includes a set of APIs that can be integrated with the mobile device 900 to allow the mobile device 900 to use any number of services associated with the enterprise system. The connect module 944 allows the mobile device 900 to establish an end-to-end secure, authenticated communication pipe with the host system. A subset of applications for which access is provided by the connect module 944 can be used to pass IT policy commands from the host system to the mobile device 900. Passing IT policy commands from the host system to the mobile device 900 can be done in a wireless or wired manner. The IT policy commands can then be passed to the IT policy module 946 to modify the configuration of the device 900. Alternatively, in some cases, the IT policy update can also be done over a wired connection.

The IT policy module 946 receives IT policy data that encodes the IT policy. The IT policy module 946 then ensures that the IT policy data is authenticated by the mobile device 900. The IT policy data can then be stored in the flash memory 906 in its native form. After the IT policy data is stored, a global notification can be sent by the IT policy module 946 to all of the applications residing on the mobile device 900. Applications for which the IT policy may be applicable then respond by reading the IT policy data to look for IT policy rules that are applicable.

The IT policy module 946 can include a parser 947, which can be used by the applications to read the IT policy rules. In some cases, another module or application can provide the parser. Grouped IT policy rules, described in more detail below, are retrieved as byte streams, which are then sent (recursively) into the parser to determine the values of each IT policy rule defined within the grouped IT policy rule. In one or more implementations, the IT policy module 946 can determine which applications are affected by the IT policy data and the IT policy module 946 can send a notification to only the applications that are affected by the IT policy data. In either of these cases, for applications that are not being executed by the main processor 902 at the time of the notification, the applications can call the parser or the IT policy module 946 when the applications are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to the "WEP User Name" IT policy rule is interpreted as a string. As another example, the setting for the "Set Maximum Password Attempts" IT policy rule is known to be an integer, and therefore the value in the IT policy data that corresponds to the "Set Maximum Password Attempts" IT policy rule is interpreted as an integer.

After the IT policy rules have been applied to the applicable applications or configuration files, the IT policy module 946 sends an acknowledgement back to the host system to indicate that the IT policy data was received and successfully applied.

Other types of software applications can also be installed on the mobile device 900, which can be third party applications that are added after the manufacture of the mobile device 900. Examples of third party applications include games, calculators, utilities, etc.

The additional applications can be loaded onto the mobile device 900 through at least one of the wireless network 905, the auxiliary I/O subsystem 912, the data port 914, the short-range communications subsystem 922, or any other suitable device subsystem 924. The flexibility in application installation increases the functionality of the mobile device 900 and may provide enhanced on-device functions, communication-related functions, or both. For example, secure communication applications may enable electronic commerce functions and other such financial transactions to be performed using the mobile device 900.

The data port 914 enables a subscriber to set preferences through an external device or software application and extends the capabilities of the mobile device 900 by providing for information or software downloads to the mobile device 900 other than through a wireless communication network. The alternate download path may, for example, be used to load an encryption key onto the mobile device 900 through a direct and thus reliable and trusted connection to provide secure device communication.

The data port 914 can be any suitable port that enables data communication between the mobile device 900 and another computing device. The data port 914 can be a serial or a parallel port. In some instances, the data port 914 can be a USB port that includes data lines for data transfer and a supply line that can provide a charging current to charge the battery 930 of the mobile device 900.

The short-range communications subsystem 922 provides for communication between the mobile device 900 and different systems or devices, without the use of the wireless network 905. For example, the subsystem 922 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 904 and input to the main processor 902. The main processor 902 will then process the received signal for output to the display 910 or alternatively to the auxiliary I/O subsystem 912. A subscriber may also compose data items, such as e-mail messages, for example, using the keyboard 916 in conjunction with the display 910 and possibly the auxiliary I/O subsystem 912. The auxiliary subsystem 912 may include devices such as: a touch screen, mouse, track ball, infrared fingerprint detector, or a roller wheel with dynamic button pressing capability. The keyboard 916 is preferably an alphanumeric keyboard and/or telephone-type keypad. However, other types of keyboards may also be used. A composed item may be transmitted over the wireless network 905 through the communication subsystem 904.

For voice communications, the overall operation of the mobile device 900 is substantially similar, except that the received signals are output to the speaker 918, and signals for transmission are generated by the microphone 920. Alternative voice or audio I/O subsystems, such as a voice message recording subsystem, can also be implemented on the mobile device 900. Although voice or audio signal output is accomplished primarily through the speaker 918, the display 910 can also be used to provide additional information such as the identity of a calling party, duration of a voice call, or other voice call related information.

Apparatus components of FIGS. 1-3 and 8-9 can be embodied as computer hardware circuitry or as a computer-readable program, or a combination of both. In another implementation, the recording apparatus is implemented in an application service provider (ASP) system.

More specifically, in the computer-readable program implementation, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in general computer environment 800 in FIG. 8, or on at least as many computers as there are components.

Conclusion

A video-recorder of a computer in violation of a filtering policy is described. A technical effect of the system is recordation and storage of video output of a computer that has violated at least one filtering policy. Although specific implementations have been illustrated and described herein, it will be appreciated by those of ordinary skill in the art that any arrangement which is calculated to achieve the same purpose can be substituted for the specific implementations shown. This disclosure is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future communication devices, different file systems, and new data types.

The terminology used in this disclosure is meant to include all filtering policies, video recording and network environments and alternate technologies which provide the same functionality as described herein.

The invention claimed is:

1. A method of recording a network access policy violation, the method comprising:
    receiving computer input corresponding to a network access policy violation by a first computer on a network, wherein a network access policy comprises a specification of network access available to a user of the first computer, and wherein the computer input corresponding to the network access policy violation by the first computer comprises a threshold number of occurrences of the network access policy violation by the first computer;
    detecting, by a second computer coupled to the first computer through the network, an occurrence of the network access policy violation by the first computer on the network;
    incrementing, by the second computer in response to the detecting, a previous number of occurrences of the network access policy violation by the first computer to a current number of occurrences of the network access policy violation by the first computer;
    determining, by the second computer, whether the current number of occurrences of the network access policy violation by the first computer satisfies the threshold number of occurrences; and
    instructing, by the second computer in response to the determining that the current number of occurrences of the network access policy violation by the first computer satisfies the threshold number of occurrences, capturing of a video output of the first computer, wherein the captured video output of the first computer relates to the network access policy violation.

2. The method of claim 1, wherein the instructing of capturing of the video output of the first computer comprises instructing the first computer, through the network, to capture the video output of the first computer and to store the captured video output of the first computer.

3. The method of claim 1, further comprising:
    in response to the instructing, capturing, by the second computer through the network, the video output of the first computer; and storing, by the second computer, the captured video output of the first computer.

4. The method of claim 1, wherein the second computer further comprises a hardware-based web filter appliance.

5. The method of claim 1, wherein the computer input corresponding to the network access policy violation further comprises a predetermined time period during which the threshold number of occurrences of the network access policy violation by the first computer must be reached before the capturing of the video output of the first computer is triggered to occur.

6. The method of claim 5, further comprising decrementing the current number of occurrences of the network access policy violation by the first computer if the threshold number of occurrences of the network access policy violation by the first computer is not reached within the predetermined time period.

7. The method of claim 1, wherein the captured video output of the first computer comprises a visual view of at least some computer input provided by the user of the first computer that resulted in detection of the network access policy violation by the first computer on the network.

8. The method of claim 1, wherein the captured video output of the first computer comprises a visual view of at least some computer input provided by the user of the first computer that follows detection of the network access policy violation by the first computer on the network.

9. A non-transitory computer-accessible medium encoding instructions that, when executed by data processing apparatus, cause the data processing apparatus to perform operations comprising:
   receiving computer input corresponding to a network access policy violation by a first computer on a network, wherein a network access policy comprises a specification of network access available to a user of the first computer, and wherein the computer input corresponding to the network access policy violation by the first computer comprises a threshold number of occurrences of the network access policy violation by the first computer;
   detecting, through the network, the network access policy violation by the first computer on the network;
   incrementing, in response to the detecting, a previous number of occurrences of the network access policy violation by the first computer to a current number of occurrences of the network access policy violation by the first computer;
   determining whether the current number of occurrences of the network access policy violation by the first computer satisfies the threshold number of occurrences; and
   instructing, in response to the determining that the current number of occurrences of the network access policy violation by the first computer satisfies the threshold number of occurrences, capturing of a video output of the first computer, wherein the captured video output of the first computer relates to the network access policy violation.

10. The non-transitory computer-accessible medium of claim 9, wherein instructing of the capturing of the video output of the first computer comprises instructing the first computer, through the network, to capture the video output of the first computer and to store the captured video output of the first computer.

11. The non-transitory computer-accessible medium of claim 9, wherein the operations further comprise:
   capturing, through the network in response to the instructing, the video output of the first computer; and
   storing the captured video output of the first computer.

12. The non-transitory computer-accessible medium of claim 9, wherein the data processing apparatus comprises a hardware-based web filter appliance.

13. The non-transitory computer-accessible medium of claim 9, wherein the computer input corresponding to the network access policy violation further comprises a predetermined time period during which the threshold number of occurrences of the network access policy violation by the first computer must be reached before the capturing of the video output of the first computer is triggered to start.

14. The non-transitory computer-accessible medium of claim 13, wherein the operations further comprise decrementing the current number of occurrences of the network access policy violation by the first computer if the threshold number of occurrences of the network access policy violation by the first computer is not reached within the predetermined time period.

15. The non-transitory computer-accessible medium of claim 9, wherein the captured video output of the first computer comprises a visual view of at least some computer input provided by the user of the first computer that resulted in detection of the network access policy violation by the first computer on the network.

16. The non-transitory computer-accessible medium of claim 9, wherein the captured video output of the first computer comprises a visual view of at least some computer input provided by the user of the first computer that follows detection of the network access policy violation by the first computer on the network.

17. A system comprising:
   a detector coupled to a computer through a network to detect through the network a network access policy violation, the network access policy violation being associated with an IP address of a monitored computer, wherein the network access policy comprises a specification of network access available to a user of the monitored computer, and wherein the network access policy violation associated with an IP address of a monitored computer comprises a threshold number of occurrences of the network access policy violation associated with an IP address of a monitored computer;
   a processor configured to cause performance of operations including:
      increment, in response to a detection of the network access policy violation associated with the IP address of the monitored computer, a previous number of occurrences of the network access policy violation associated with the IP address of the monitored computer to a current number of occurrences of the network access policy violation associated with the IP address of the monitored computer, and
      determine whether the current number of occurrences of the network access policy violation by the monitored computer satisfies the threshold number;
   a capturer configured to capture, in response to a determination that the current number of occurrences of the network access policy violation associated with the IP address of the monitored computer satisfies the threshold number, a video output of the monitored computer, wherein the captured video output of the monitored computer relates to the network access policy violation; and
   memory configured to store the captured video output of the monitored computer.

18. The system of claim 17, wherein the video output of the monitored computer comprises a visual view of at least some computer input provided by the user of the monitored computer that resulted in detection of the network access policy violation by the monitored computer.

19. The system of claim 17, wherein the video output of the monitored computer comprises a visual view of at least some computer input provided by the user of the monitored computer that follows detection of the network access policy violation by the monitored computer.

20. The system of claim 17, wherein the network access policy violation associated with an IP address of a monitored computer further comprises a predetermined time period during which the threshold number of occurrences of the network access policy violation associated with an IP address of a monitored computer must be reached before the capturing of the video output of the monitored computer is triggered to occur.

21. The system of claim 20, wherein the processor further decrements the current number of occurrences of the network access policy violation associated with an IP address of a monitored computer if the threshold number of occurrences of the network access policy violation by the monitored computer is not reached within the predetermined time period.

22. The system of claim 17, wherein the system comprises a hardware-based web filter appliance.

* * * * *